United States Patent [19]

Rosette et al.

[11] 3,980,514

[45] Sept. 14, 1976

[54] ADHESIVE BINDING APPARATUS

[76] Inventors: Alan S. Rosette, 18 Charing Cross, Fairport, N.Y. 14450; Robert B. Ellenson, 52 Round Trail Drive, Pittsford, N.Y. 14534

[22] Filed: Feb. 14, 1974

[21] Appl. No.: 442,588

[52] U.S. Cl. .......................... 156/477 B; 11/1 AD; 118/261; 156/578

[51] Int. Cl.[2] .......................................... B32B 1/00

[58] Field of Search ...................... 156/477 B, 577; 11/1 AD, 3; 118/101, 103, 104, 244, 261, 602

[56] References Cited

UNITED STATES PATENTS

| | | | |
|---|---|---|---|
| 279,219 | 6/1883 | Brown | 118/261 X |
| 447,012 | 2/1891 | Knowlton et al. | 118/261 X |
| 680,802 | 8/1901 | McClellan | 11/3 |
| 1,192,380 | 7/1916 | Brackett | 118/261 X |
| 2,246,126 | 6/1941 | Davies | 118/261 X |
| 2,269,150 | 1/1942 | Flynn | 118/261 X |
| 2,523,860 | 9/1950 | Budden | 11/1 AD X |
| 2,991,753 | 7/1961 | Dearsley | 118/602 X |
| 3,030,916 | 4/1962 | Brown et al. | 118/261 X |
| 3,718,115 | 2/1973 | Lee | 118/261 X |
| 3,757,736 | 9/1973 | Anderson | 11/1 AD X |

*Primary Examiner*—David A. Simmons
*Attorney, Agent, or Firm*—Fred L. Denson

[57] ABSTRACT

A reciprocal action apparatus for adhesively binding together pages to form a book is described. The apparatus contains two basic components; a stationary support member and a movable carriage member. The stationary support member contains carriage drive means, a clutch assembly for engaging and disengaging the carriage drive means, a cover mounting assembly, an adhesive applicator and reservoir assembly and an elongated carriage bar member. The movable carriage member which includes a clamping assembly for holding together the pages being bound travels in a reciprocating manner along the elongated carriage bar member. In operation, the movable carriage member transports the pages being bound to a first station where they are tangentially contacted by a rotating adhesive applicator. In association with the rotating adhesive applicator are scraper blades and "doctor" blade. The doctor blade controls the amount of adhesive on the applicator, one scraper blade removes excess adhesive from the edges of the book, and a second scraper blade for removing adhesive from the rotating applicator after the applicator has presented adhesive to the pages.

15 Claims, 16 Drawing Figures

4
100
101
102
103
104
105
106
107
108
109
110
111
112
113
114
115
116
117
118
119
120
121
123
124
125
126
180
5
TO 93

FIG. 11a
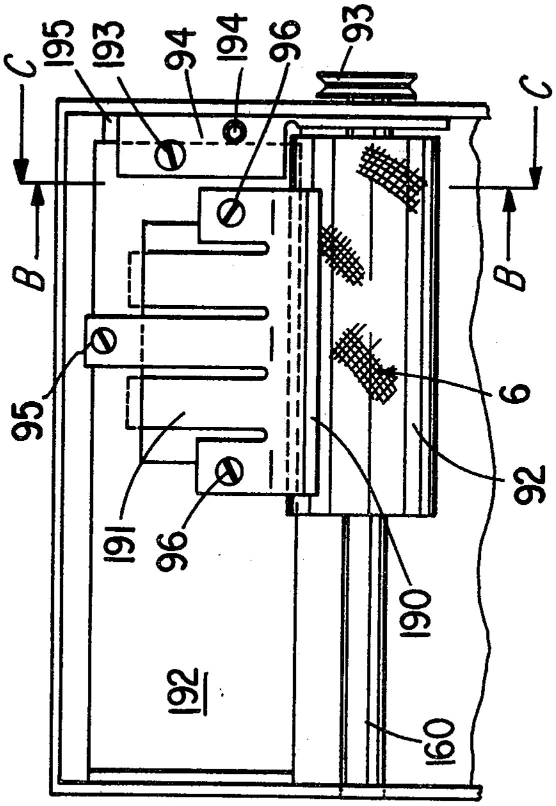
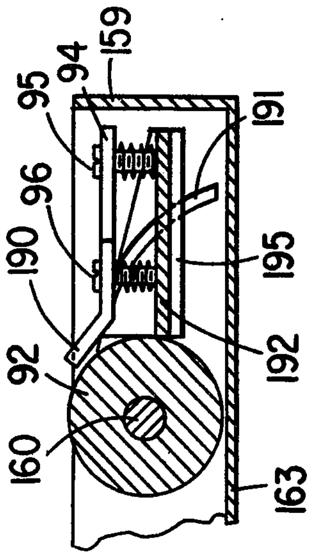
FIG. 11c
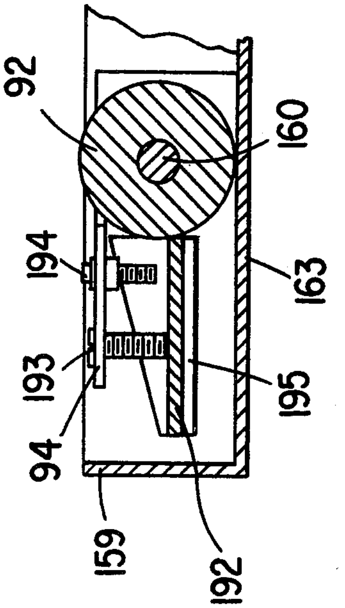
FIG. 11b

ADHESIVE BINDING APPARATUS

BACKGROUND OF THE INVENTION

This invention relates to a reciprocal action apparatus for adhesively binding together pages to form a book and apparatus for mounting a cover on the book thus formed.

In various places where reports are rendered or books are prepared, such as schools, offices, churches, factories, homes, etc., it is either desirable or necessary to permanently affix the individual pages thereof in a bound relationship. The application of an adhesive material to the edge of the pages represents a very economic and efficient mode for binding the pages together. Several types of machines are available for adhesively binding pages together. Most of these machines however, are large, bulky, expensive and frequently are permanent fixtures on a premises. Moreover, they are not readily transportable, therefore, work must be brought to the machine instead of the machine being used at the situs of the work. This can sometimes prove to be costly and inconvenient.

Of the few adhesive binding machines which are transportable, a major limitation is the size and number of pages which can be efficiently bound at one time. Much time, effort and money has been spent finding ways to obtain a more efficient binding between pages upon application of the adhesive material. Since the strength of the bond formed in a function of several variables, including mode of application of the adhesive material, adhesive material temperature, homogeneity of the adhesive material, the adhesive material employed, drying conditions, properties of the pages being bound, etc., optimization of these variables to obtain the most efficient bond requires either elaborate, expensive equipment or slow, expensive manual labor.

Anther problem has been finding means to accurately apply a cover to the pages of a book. Many machines currently used rely solely upon the judgement of the operator to obtain an accurate registration of cover to book. Those machines which have registration devices are expensive and can require considerable maintenance and repair. An additional trimming step is frequently employed in conjunction with those machines which do not have a cover registration means to make the cover and pages the same size.

A relatively complex and difficult to operate machine is required to surmount all of the above obstacles. Yet, for a machine to be conveniently compatible in a home, school, church, office or similar setting, it should possess a few moving parts in order to reduce a high frequency of repair and maintenance as well as to facilitate its operations. Base of operation not only includes the internal workings of the machine but also includes a quick, easy and reliable way to position the pages for binding and to position a book for covering. It further includes ease of access to the inside of the machine, e.g., for repair or adjustment purposes and for adding additional adhesive material.

In copending application Ser. No. 334,865, filed Feb. 22, 1973 of Rosette et al., a reciprocal action apparatus for adhesively binding together pages to form a book is described which overcome the above problems. The apparatus comprises a stationary support member and a movable carriage member. The stationary support member includes carriage drive means, a clutch assembly for engaging and disengaging the carriage drive means, a cover mounting assembly, an adhesive applicator and reservoir assembly and an elongated carriage bar member. The movable carriage member which includes a clamping assembly for holding together the pages being bound travels in a reciprocating manner along the elongated carriage bar member. In operation, the movable carriage member transports the pages being bound to a first station where they are tangentially contacted by a rotating adhesive applicator.

It has been found that after the rotating applicator presents adhesive materials to the pages, a thin coating of adhesive remains on the applicator. After a period of time, a small build of adhesive can build up on the applicator thereby requiring removal of the applicator in order to clean it and in any event, the thin coating of adhesive can prevent further uniform presentation of fresh, hot adhesive to further pages which are subsequently bound.

In accordance with this invention, means are provided for removing adhesive material from the surface of the rotating applicator after the surface of the applicator has been coated with adhesive and said adhesive has been presented for application to the pages being bound.

OBJECTS OF THE INVENTION

It is, therefore, an object of this invention to provide means for easily and efficiently removing excess adhesive from a rotating adhesive applicator which is in combination with a book binding apparatus.

Another object of this invention is to prevent undesired accumulation and build up of adhesive on a rotating cylindrical adhesive applicator which is in combination with a book binding apparatus.

A still further object is to continuously present a fresh, uniform hot layer of adhesive material to pages so as to form a firm bond among the page thereby forming a book.

SUMMARY OF THE INVENTION

Those and other objects of this invention are accomplished with a reciprocal action apparatus for adhesively binding together pages to form a book. The apparatus contains two basic components; a stationary support member and a movable carriage member. The stationary support member contains carriage drive means, a clutch assembly for engaging and disengaging the carriage drive means, a cover mounting assembly, an adhesive applicator and reservoir assembly and an elongated carriage bar member. The movable carriage member which includes a clamping assembly for holding together the pages being bound travels in a reciprocating manner along the elongated carriage bar member. In operation, the movable carriage member transports the pages being bound to a first station where they are tangentially contacted with a rotating adhesive applicator.

In association with the rotating adhesive applicator are a scraper blade and a doctor blade as more fully described herein and described in copending application Ser. No. 334,865. There is now additionally provided a second scraper blade for continuously removing excess adhesive from a rotating adhesive applicator after the adhesive has been presented to the pages but prior to the applicator's rotation through an adhesive reservoir. After presentation of the pages with adhesive, a cover is applied by the cover mounting assembly at a second station. The finished book with cover is then removed from the clamping assembly. It is to be understood that the term "pages" as used herein includes not only the usual paper sheets, but also any sheet-like materials such as leaves, films, foils or other materials commonly employed in graphic reproductions. The term "book" as used herein refers to a compilation of two or more pages as defined above which are adhesively bound together. Specific inventive details and advantages are described hereafter.

BRIEF DESCRIPTION OF THE DRAWINGS

FIG. 11*a* is a top view of the adhesive applicator assembly.

FIG. 11*b* is a sectional view taken along lines B—B of FIG. 11*a*.

FIG. 11*c* is a sectional view taken along lines C—C of FIG. 11*a*.

DETAILED DESCRIPTION OF THE INVENTION

Overall Assembly

Figure 1:
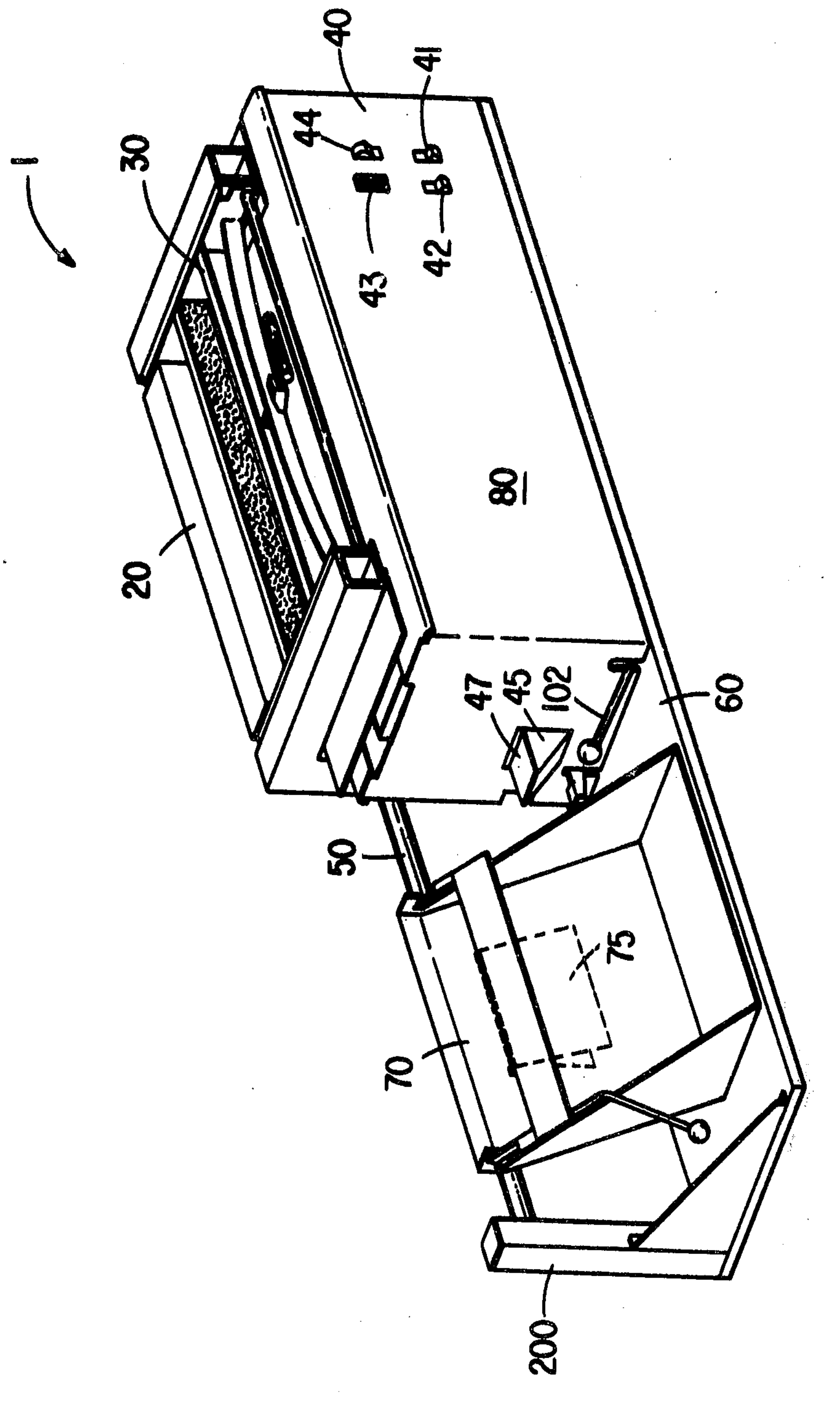
FIG. 1 is a perspective view of the front of the apparatus constructed in accordance with the invention as described in copending application Ser. No. 334,865 showing the position of the component members before pages have been adhesively bound together.
Figure 2A:
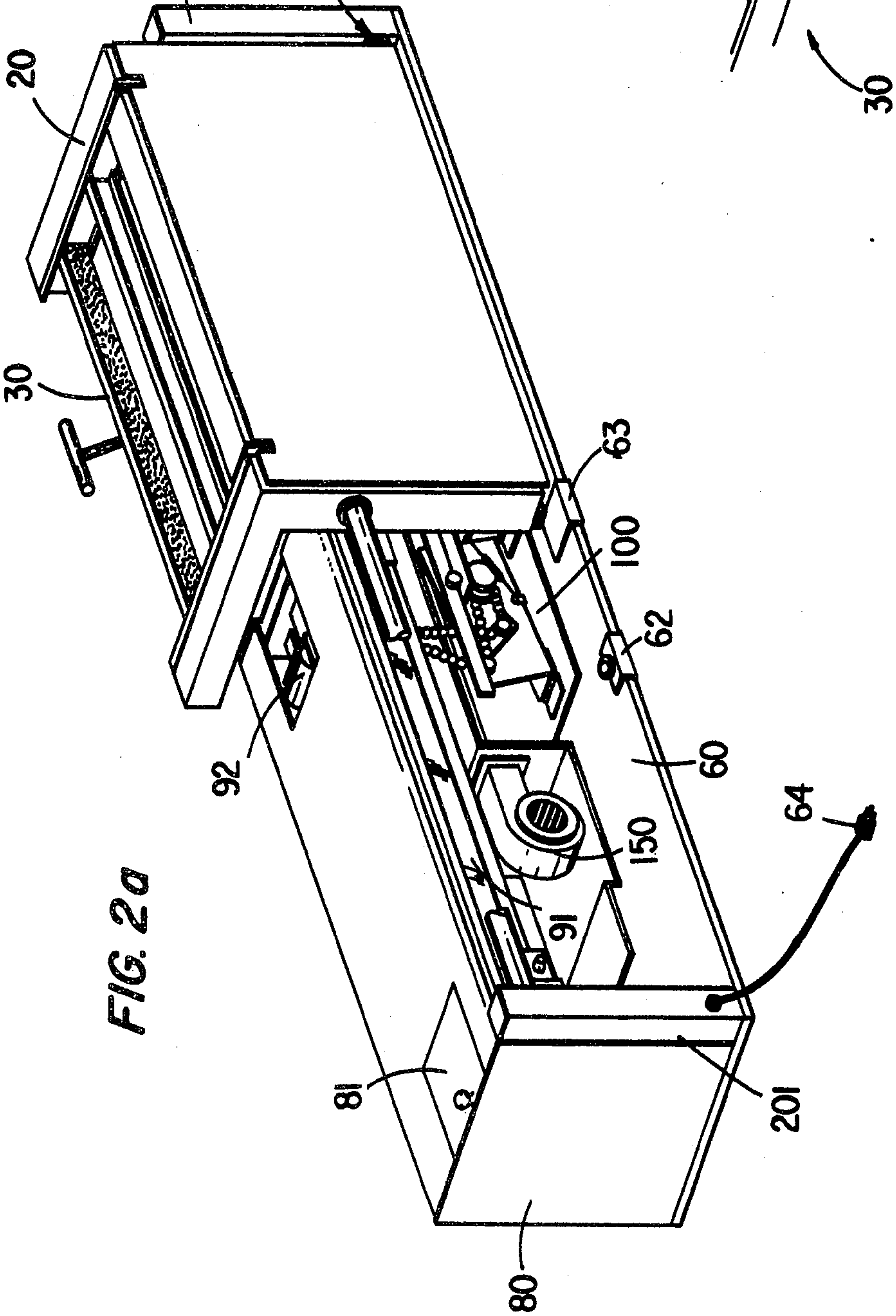
FIG. 2*a* is a perspective view of the rear of the apparatus of FIG. 1 after the pages have been adhesively bound together.
Figure 2B:
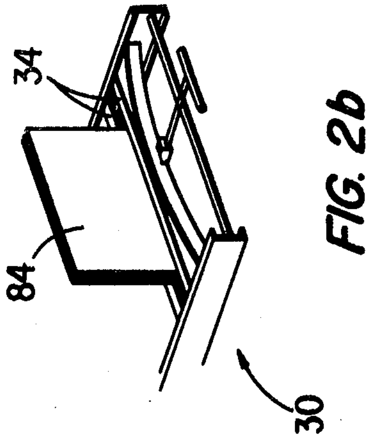
FIG. 2*b* is a perspective view of the clamping apparatus of FIG. 1 showing the pages in a clamped position.

FIG. 1 sets forth an overall view of the front of the apparatus for adhesively binding together pages to form a book. The overall assembly 1 includes a stationary support member 80 having base 60, carriage drive housing 40 and an elongated carriage bar member 50. Carriage drive housing 40 serves as an enclosure for the carriage drive system and blower. Carriage bar member 50 is positioned above and transversely parallel to base 60 and is supported by vertical end posts 200 and 201 (FIG. 2*a*). Movable carriage member 20 contains clamping assembly 30 and is positioned to transversely move along elongated carriage bar member 50 in a reciprocal manner. Clamping assembly 30 carries pages 84 (FIG. 2*b*) to be adhesively bound together in clamped relationship. Handle 102 functions to engage and disengage a carriage drive means. Thus, when handle 102 is moved downward, transverse motion is imparted to movable carriage member 20. After movable carriage member 20 has transversed to the end of carriage bar member 50, a cover may be appplied to the bound pages by cover mounting assembly 70. If a cover is not required, cover mounting assembly 70 may be omitted.

Blower vent 45 is also provided in carriage drive housing 40 to discharge heat accumulated within the enclosure. The warm effluent air discharged from vent 45 can be directed against the adhesive bearing spine of the pages being bound to accelerate setting time. When cover mounting assembly 70 is utilized, vent 45 is closed by lid 47 to prevent premature setting of the adhesive bearing spine before a cover is applied. Switches 41, 42 and 44 control power to the apparatus, including the heater, blower, relays and motor.

FIG. 2*a* shows blower 150 situated on base 60 of stationary support member 80. Movable carriage member 20 is traversed to its final position and the edge of pages carried in clamping assembly 30 have received a layer of adhesive material by passing over rotating adhesive applicator 92. Adhesive material is added to adhesive reservoir 91 through an opening contained in cover 81. Power is supplied to the apparatus through power cord 64. Resilient stop 65 limits the transverse movement of movable carriage member 20 along elongated carriage bar member 50 supported by vertical end posts 200 and 201 of stationary support member 80. Resilient stop 65 is made from a resilient material and causes movable carriage member 20 to slightly retrace its traversed path of travel by a controlled distance to bring cover mounting assembly 70 into registration with clamping assembly 30 in order to ensure that a cover is properly mounted on the spine of the adhesive bearing book pages. The distance retraced is important for accurate registration of cover to book. This distance can be carefully controlled by adjusting the area of resilient stop 65 which contacts movable carriage 20. Guide 62 assists in ensuring that movable carriage member 20 remains in proper alignment. Also, hop cam 63 eliminates accumulation of adhesive on the spine of the book being formed as described below. Carriage drive system 100 is affixed to stationary support member 80 and is described in greater detail in FIGS. 3*a* and 3*b*.

Carriage Drive Assembly

Figure 3A:
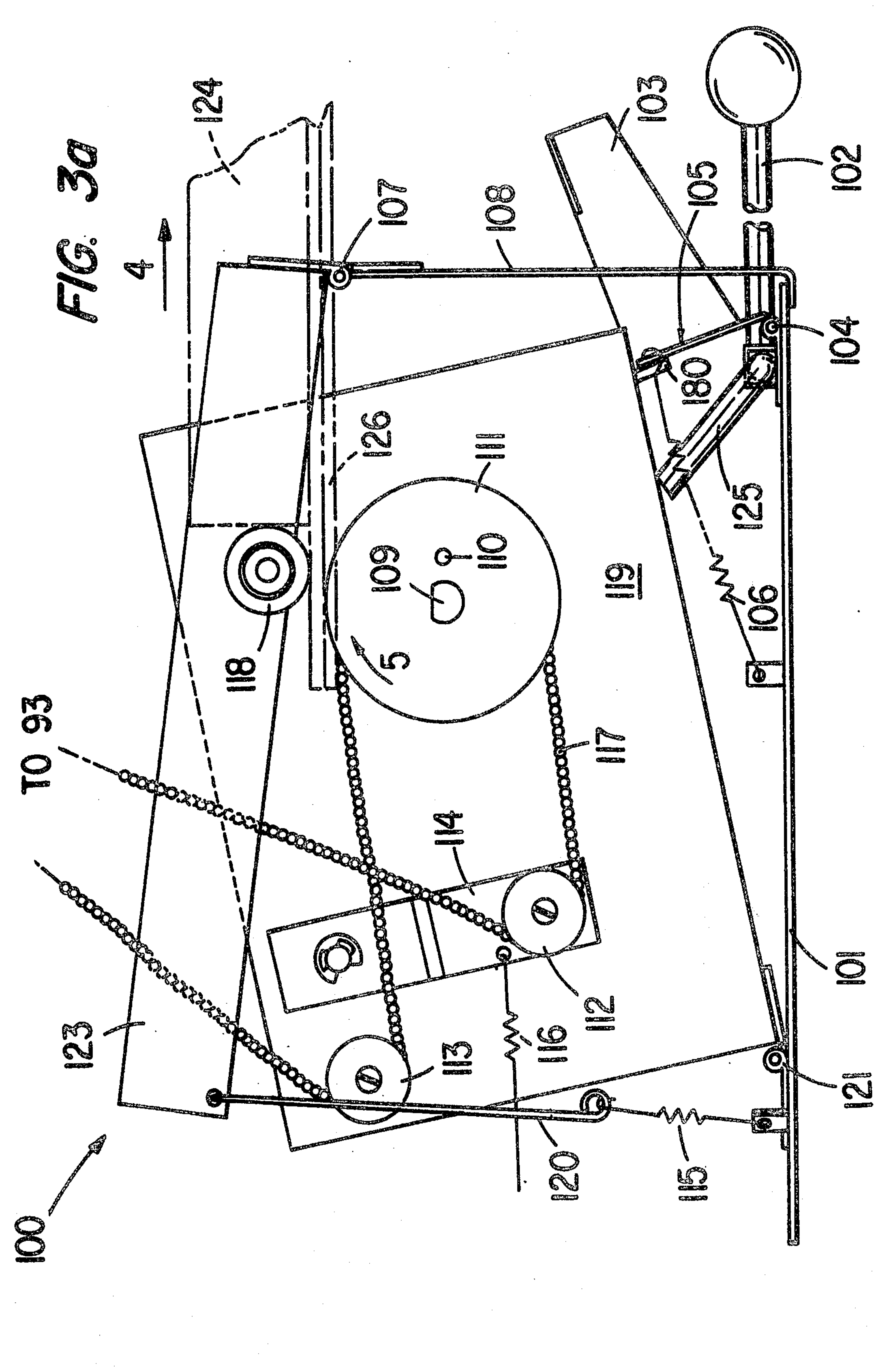
FIG. 3*a* is an orthographic view showing the carriage drive means in an engaged position.

Carriage drive assembly 100 of FIG. 3*a* includes a carriage drive means and a clutch assembly. The carriage drive means includes elongated floating drive bar member 124 which is positioned on movable carriage member 20 and is substantially parallel to elongated carriage bar member 50. Optionally positioned on the lower portion of floating drive bar member 124 is a V-wedge 126 which may extend the length of member 124.

Rotatable drive roller 111 is positioned tangentially adjacent to floating drive bar member 124. Rotation of drive shaft 109 causes roller 111 to rotate. Clockwise rotational motion of roller 111 as indicated by arrows 5 is translated to linear motion of floating drive bar member 124 in a forward direction as indicated by arrow 4. Forward movement of drive bar member 124 causes forward movement of the entire movable carriage member.

Figure 7:
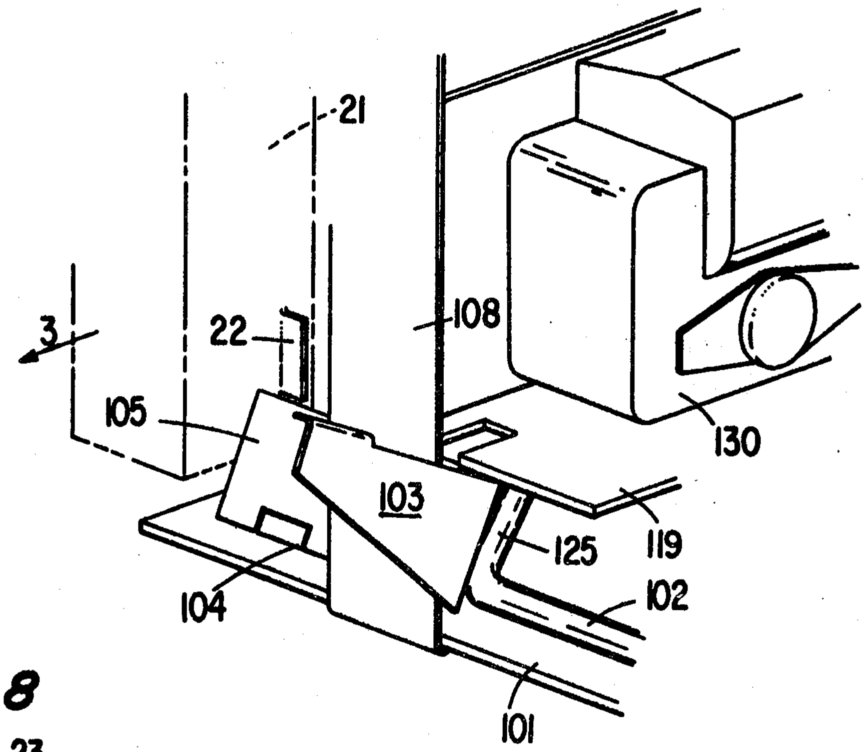
FIG. 7 is a perspective view of a portion of the clutch assembly.

Drive roller 111 can be made of any suitable material including metal or plastic and may be of any design, e.g., a sheave, a gear, flat roller, a rubber wheel, etc. The portion of floating drive bar member 124 in contact with drive roller 111 contains a design which is complementary to the design of roller 111. A typical design for roller 111 is a sheave, and a typical complementary design for the bottom portion of floating drive bar member 124 is a V-wedge as shown in 126. Drive shaft 109 is suitably powered by electric motor 130 (FIG. 7).

Figure 10:
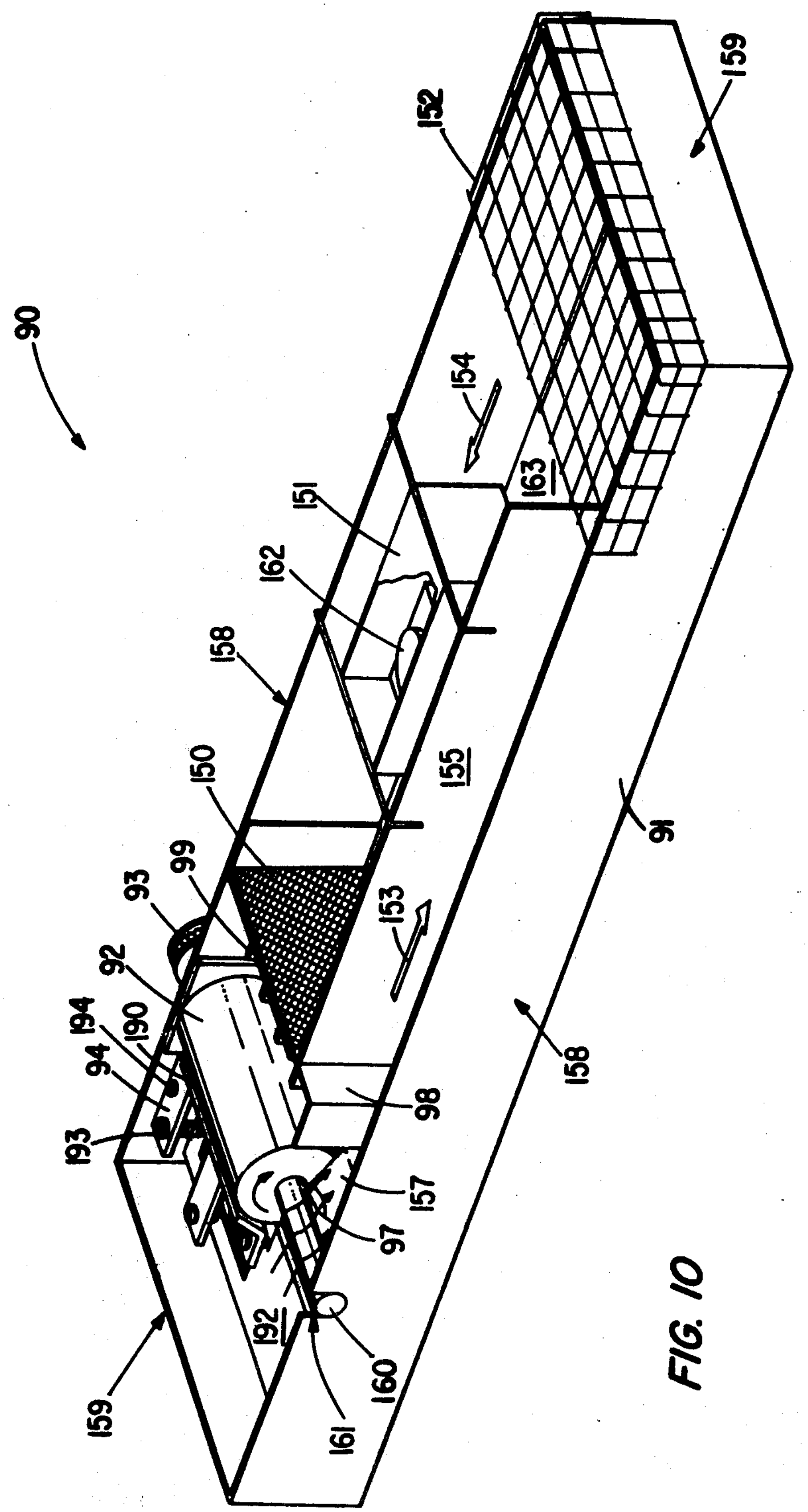
FIG. 10 is a perspective view of the adhesive reservoir and applicator assembly.

Drive roller 111 and motor 130 (FIG. 7) are mounted on platform 119 which has its rear portion attached by hinge 121 to carriage drive assembly base 101. The forward end of platform 119 is elevatable by lever 125 which is raised by lowering handle 102. As platform 119 is elevated, platform support plate 105 rotates on hinge 104 and is pulled rearward by spring 106 until it comes to rest against stop 180 positioned on the underside of platform 119. In its final position, support plate 105 holds platform 119 in an elevated position whereby drive roller 111 is placed in contact with floating drive bar member 124. Support plate 105 is returned to its original lowered starting position either by downward force applied to platform support manual release 103 or platform support automatic release 22 (FIG. 7). In order to ensure that proper contact is maintained between drive roller 111 and drive bar 124, rotatable pressure idler roller 118 is maintained in tangent contact with the opposite side of the portion of drive bar member 124 adjacent to drive roller 111. Roller 118 is mounted on elongated idler support member 123, one end of which is pivotally attached by hinge 107 to stationary support member vertical extenstion 108, and the remaining end of which is attached to carriage drive assembly base 101 by spring 115 and spring hook 120. Spring 115 causes roller 118 to exert pressure on member 124, thereby ensuring that it is maintained in good contact with drive roller 111. Power from drive shaft 109 in addition to being used to drive roller 111, is also used to drive adhesive applicator roller 93 (FIG. 10). Chain or belt 117 transmits the power to roller 93. Tension idler arm spring 116 provides the necessary force to maintain proper tension on chain or belt 117, spring 116 being attached to tension idler arm 114. The chain is directed to and from drive roller 111 over guide rollers 112 and 113.

Figure 3B:
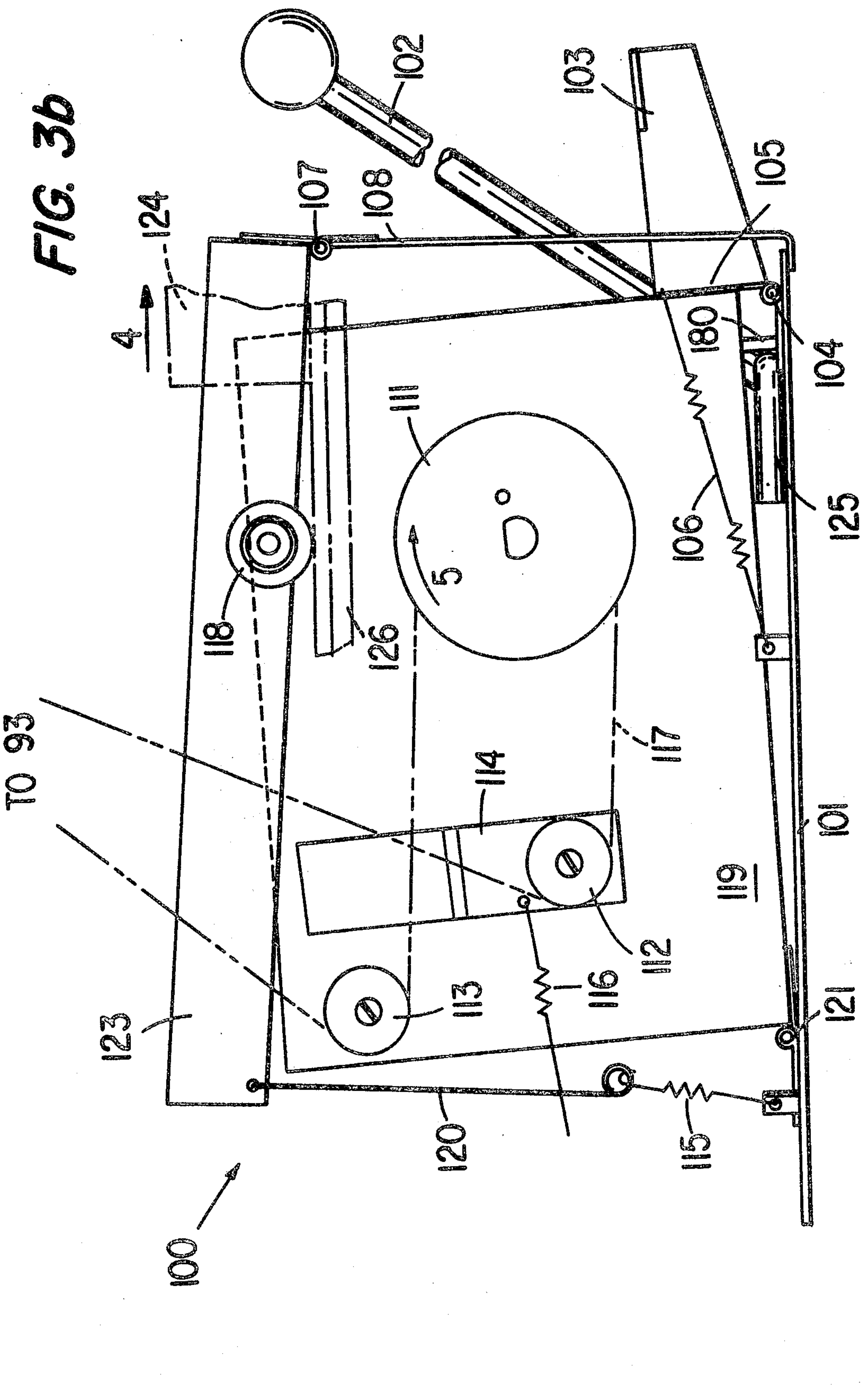
FIG. 3*b* is an orthographic view showing the carriage drive means in a disengaged position.

FIG. 3*b* is similar to FIG. 3*a* except it shows platform 119 in its lowered position which causes disengagement of drive roller 111 from floating drive bar 126. Since the drive roller is disengaged, no motion is imparted to movable carriage member 20.

The clutch assembly including platform 119, hinge 121, lever 125, handle 102, platform support plate 105, stop 180, hinge 104, spring 106, and platform support manual release 103 are operated in combination to engage and disengage drive roller 111 from elongated floating drive bar 124. Further details of the operation of the clutch assembly are set forth below.

Page Clamping Assembly

Figure 4:
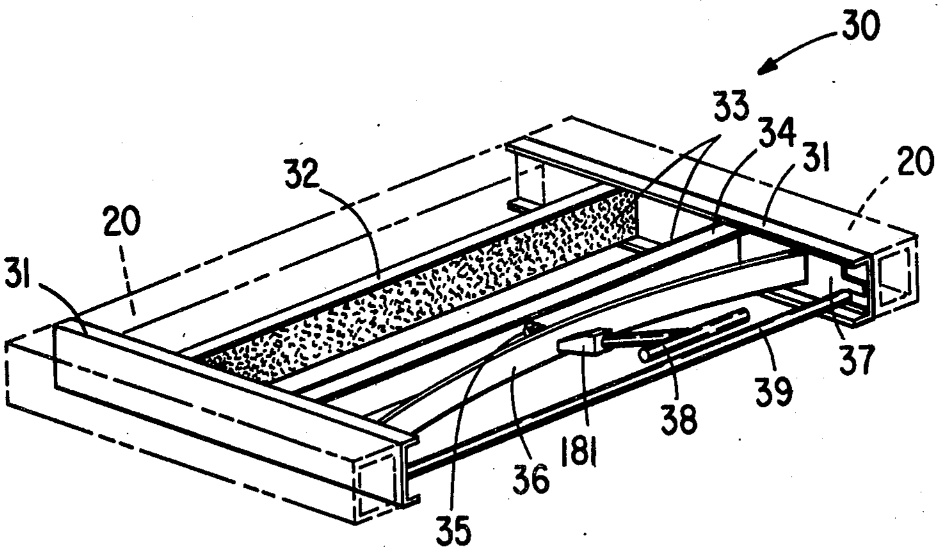
FIG. 4 is a perspective view of the clamping assembly.

Clamping assembly 30 of FIG. 4 is attached to movable carriage member 20 and includes a clamp assembly frame having two inwardly facing parallel channels 31 joined by spacing member 39. Stationary clamp face member 32 is supported by inwardly facing parallel channels 31. Movable clamp face member 34 has an elongated face portion 33 which is transverse to and supported by the inwardly facing parallel channels 31.

Clamp face member 34 also has transverse extensions 37 disposed at each end of member 34 which are also supported by inwardly facing parallel channels 31. The ends of flat locking spring member 36 are inserted through slots in extensions 37 and terminate against the inner surface of parallel channels 31. In this position, lock spring member 36 prevents rearward movement of movable clamp face member 34.

Deflection of lock spring member 36 is caused by rotation of cam member 181. When deflected, the ends of lock spring member 36 are withdrawn from contact against the inner surfaces of parallel channels 31 permitting movement of movable clamp face 34. The center portion of lock spring member 36 is supported by transverse support member 35 extending outwardly from the center portion of the outer surface of movable clamp face member 34. Rotatable cam member 181 is also connected to support member 35. As member 181 is rotated by movement of clamp handle 38, it causes lock spring member 36 to ride inwardly along the surface of transverse support member 35.

Faces 33 of movable clamp face member 34 and stationary clamp face member 32 can be coated with any frictional material such as cork or cork impregnated with neoprene. The frictional material reduces the tendency of the pages to slip when positioned in the clamping assembly.

Movable Carriage Member

Figure 5:
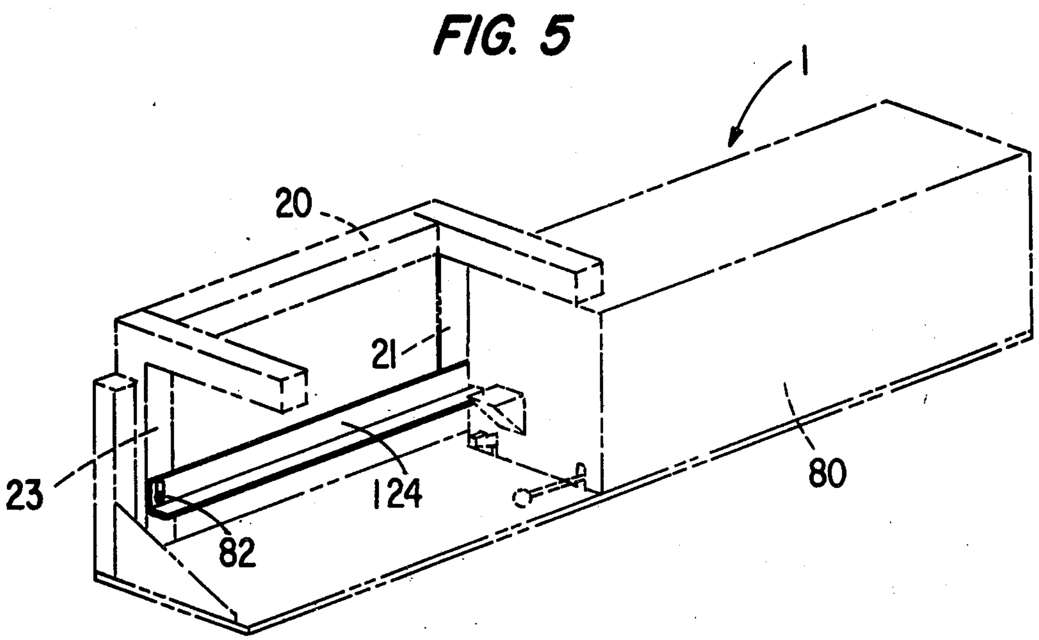
FIG. 5 is a perspective view showing the function of the floating drive bar member.

FIG. 5 shows the position of movable carriage member 20 after adhesive material has been applied to the pages being bound. In this position, drive roller 111 has moved floating drive bar member 124 to its final position. Floating drive bar member 124 is maintained in position by screws 82.

Cover Mounting Assembly

Figure 6:
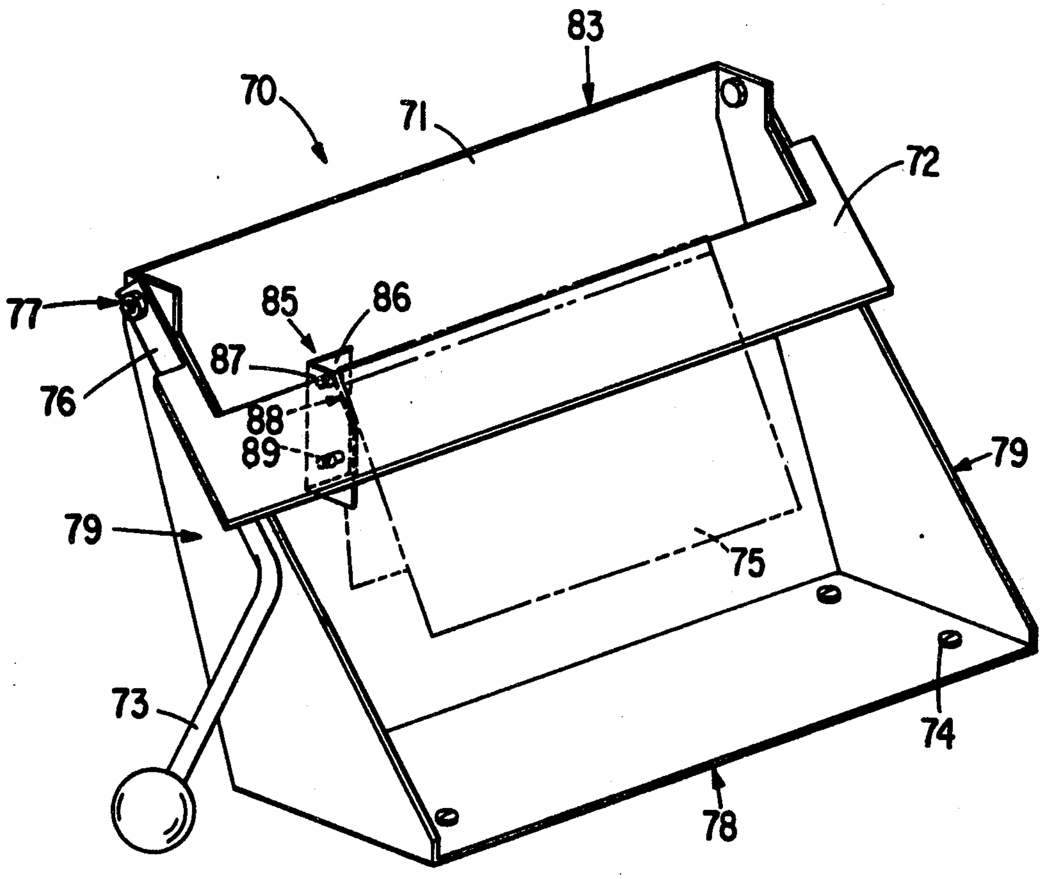
FIG. 6 is a perspective view of the apparatus for adhesively binding a cover to a book.

In addition to adhesively binding pages together to form a book, the apparatus of this invention can also be utilized to adhesively bind a cover to the book thus formed by utilization of cover mounting assembly 70 of FIG. 6. Cover mounting assembly frame 71 contains sides 79, base 78 and back 83. Elongated cover mounting bar 72 has transverse extensions 76 positioned at either end thereof which are pivotally attached by bolt 77 to sides 79. A book cover 75 to be mounted on an adhesive bearing spine of a book is placed on mounting bar 72 and is lifted into adhesive contact with the spine of the book by handle 73. Mounting bar 72 is capable of holding several covers at once thereby eliminating the necessity of providing bar 72 with another cover at the end of each cycle. Fastening means such as screws 74 attached assembly 70 to base 60 (FIG. 1) of stationary support member 80 (FIG. 1).

Attached to cover mounting assembly frame back 83 is cover mounting stop 85. Cover mounting stop 85 is L-shaped and contains base section 86 and support section 87. Stop base 86 is attached to frame back 83 by screws 89. Support section 87 contains slanted edge 88 which serves to support cover mounting bar 72 in its down or rest position. Covers placed on cover mounting bar 72 are seated flush against edge 88 to insure proper registration of cover to book carried in clamping assembly 30.

Clutch Assembly

As previously explained, when the drive roller 111 is engaged to cause movement of elongated floating drive bar member 124 (FIG. 3*a*), the clutch assembly maintains platform 119 in an elevated position. In accordance with FIG. 7, drive roller 111 is disengaged by platform support automatic release 22 striking platform support plate 105 from the rear side causing plate 105 to be removed from its supporting position under plateform 119 by rotating about hinge 104. Release 22 is attached to trailing leg 21 of movable carriage member 20 and as carriage member 20 is moved forward, as indicated by direction arrow 3, release 22 contacts the rear side of platform support plate 105. Support plate 105 can be optionally lowered manually by downward movement of platform support manual release 103. Motor 130 provides power to drive roller 111 (FIG. 3*a*) by drive shaft 109 (FIG. 3*a*). Platform 119 is raised into position by movement of handle 102 and lever 125.

Hop Cam Assembly

Figure 8:
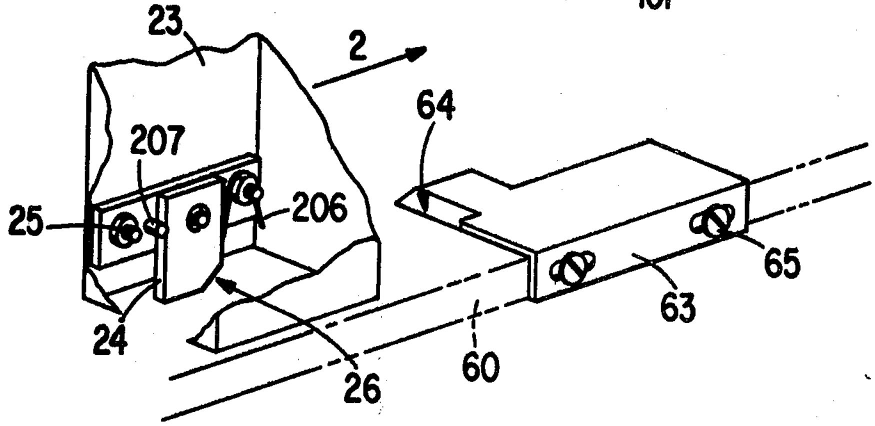
FIG. 8 is a perspective view of a cam member and cam follower.

Hop cam 63 and hop cam follower 24 of FIG. 8 prevent undesired accumulation of adhesive material at the forward end of the pages being bound together when the adhesive applicator first contacts the pages. Hop cam 63 having cammed surface 64 is attached to the base of stationary support member 60 by adjustment screws 65. Hop cam follower 24 having cammed surface 26 is pivotally attached to leading leg 23 of movable carriage member 20 by adjustment screws 25. As movable carriage member travels in the direction of arrow 2, cammed surface 26 rides up cammed surface 64 and along the top of hop cam for a short distance before returning to its normal position. This action causes the entire movable carriage member 20 to be lifted, including assembly 30 containing the pages being adhesively bound. Hop cam 63 is adjusted in a manner such that the adhesive applicator initially contacts the pages at a point slightly rearward of the leading end of the pages thus preventing an undesired accumulation of adhesive at that point. Elongated carriage bar member 50 (FIG. 1) is designed to absorb the slight stress created by hop cam 63 raising movable carriage member 20. Instead of a cammed surface, follower 24 may have a rounded surface or any other type of surface which will facilitate its movement up and over hop cam 63. When movable carriage member 20 is returned from its final position to its starting position, cam follower 24 rides up and over hop cam 63 by pivoting rearward against spring 206. After it is past hop cam 63, cam follower 24 is returned to its original position by spring 206 pushing cam follower 24 against stop 207.

Rotatable Guide Assembly

Figure 9:
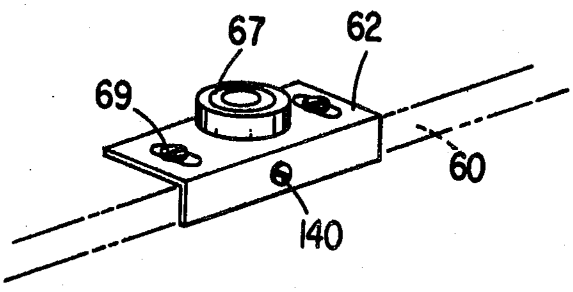
FIG. 9 is a perspective view of a rotary guide member.

In order to insure that movable carriage member 20 (FIG. 1) travels in a relatively straight path, rotatable guide assemblies 62 (FIG. 2 and 9) are attached to stationary support base 60 by screws 69 along the desired path of travel. Rotatable member 67 tangentially contacts the side of movable carriage member 20 as it traverses its path. Adjustment screws 140 are provided to properly position assembly 62.

Adhesive Reservoir And Applicator Assembly the adhesive reservoir and applicator assembly 90 of FIG. 10 conditions the stored adhesive material to maintain it in a flowable state and applies it to the spine of a book being bound. Reservoir 91 contains two sets of parallel sides 158 and 159 and bottom 163. A cylindrical adhesive applicator 92 is rotatably mounted on axle 160 positioned in cut out 161 on side 158 of the reservoir. The applicator is suitably driven by adhesive applicator drive roller 93. Scraper blade 190 removes excess adhesive applied to the spine of a book to which adhesive material has been applied by applicator 92. Doctor blade 192 controls the thickness of adhesive material on the surface of applicator 92 by removing excess adhesive therefrom. Screws 193 and 194 in applicator bracket 94 are utilized to adjust the position of the doctor blade 192 with respect to applicator 92. Axle 160 also serves as a pump to circulate the adhesive material through the remainder of the reservoir following the direction of arrows 153 and 154. Screen 150 extends inwardly from side 158 and is perpendicular to base 163. Its position immediately in front of and upstream from applicator 92 serves to partition off a pumping compartment. The screen reduces the number of air pockets in the adhesive before it is laminated on applicator 92 thus enabling a smoother coating to be applied to the spine of the pages being bound. Screen 150 also prevents foreign particles from entering into the pumping compartment. Screen 150 is supported by support member 98 which also has baffle guides 99 attached thereto. A means for heating the adhesive material in the reservoir, if necessary, is situated below base 163. Baffle guides 99 not only control flow direction but also function as heat conductors to conduct heat from the base 163 to uniformly heat adhesive material contained in the pumping compartment. Baffle guides 99 are preferably made from a material which readily conducts heat, including metals and alloys such as aluminum, copper, steel, etc. Adhesive material is removed from pump compartment by the pumping action of axle 160, effluent 97 flowing over ramp 157 into a discharge compartment.

Baffle 155 is perpendicular to base 163 and extends from screen 150 toward the end of reservoir 91 away from the pumping compartment. Preferably, baffle 155 is parallel to sides 158 and serves to separate the discharge compartment where adhesive material flows away from applicator 92 as indicated by 153 to an intake compartment where adhesive flows toward applicator 92 as indicated by 154. It also functions to transfer heat from base 163 to the adhesive material contained in reservoir 91. For those adhesive materials requiring heat to render them in a flowable state, thermostat 162 situated in container 151 controls the temperature of the adhesive material. Additional adhesive material is added to reservoir 91 by opening door 81 (FIG. 2). Safety screen 152 prevents hot adhesive from touching fingers of the operator as well as keeping foreign materials from inadvertently entering the reservoir.

FIGS. 11*a*, 11*b* and 11*c* show the positioning of the components of the adhesive applicator blade assembly. Scraper blade 190 is positioned on and attached to doctor blade 192 by adjustment screws 95 and 96. Scraper blade 190 adjusts the thickness of adhesive on the spine of the pages of the book being bound. In order for blade 190 to function efficiently with certain adhesives, it should be heated. Heating of blade 190 is accomplished by heat conductor sections 191 which are situated transverse to blade 190 and are immersed into the body of hot adhesive material. Heat is transferred by sections 191 to the scraper blade 190 so that it remains at an elevated temperature during operation. Doctor blade 192 is supported by doctor blade bracket 195.

Figure 11D:
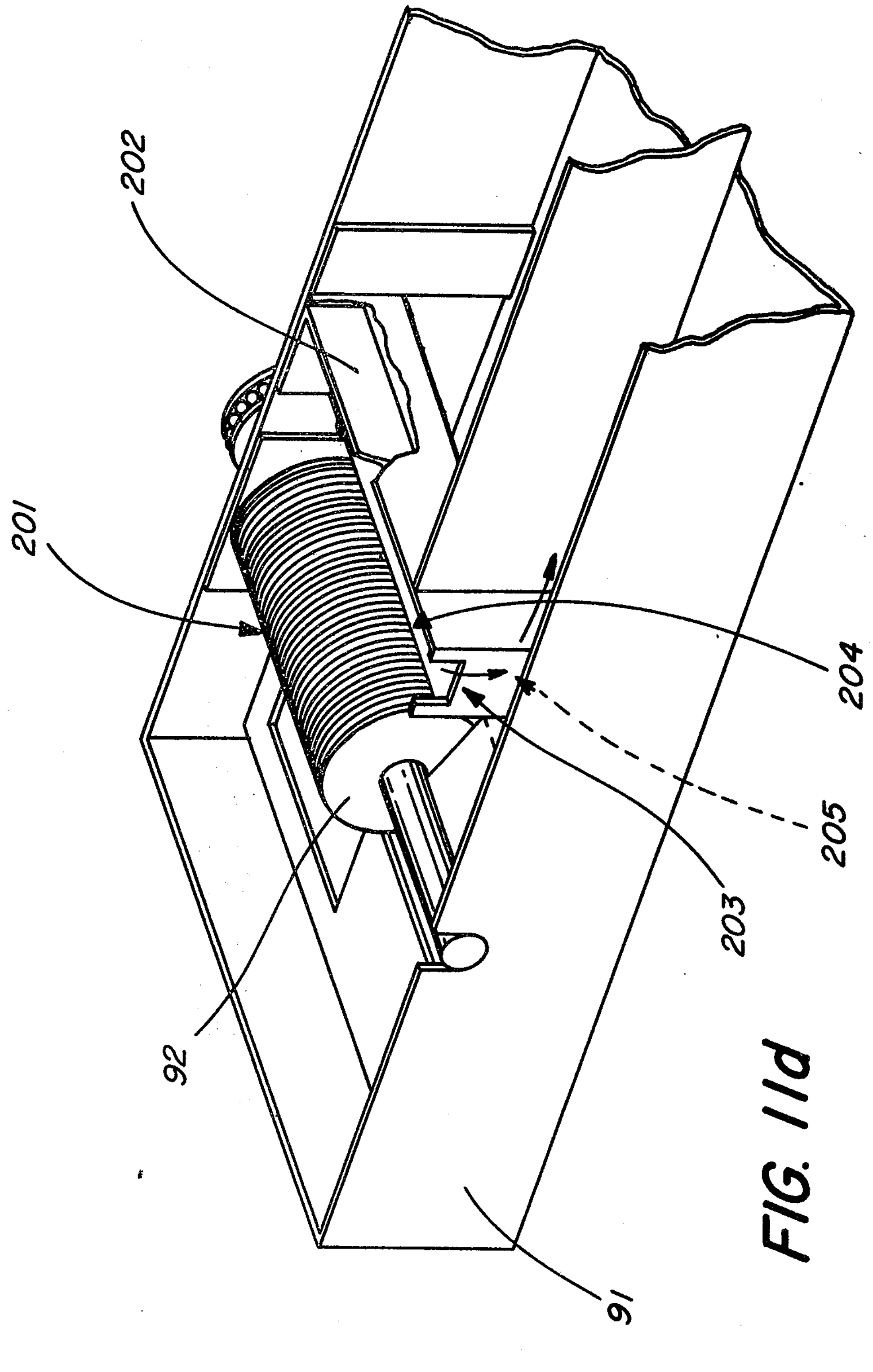
FIG. 11*d* is a perspective view of the apparatus constructed in accordance with this invention.

FIG. 11*d* represents an alternative embodiment of the adhesive applicator assembly. Applicator 92 contains a roughened or patterned surface 201 comprised of a series of lands and grooves. As previously described, the roughened surface 201 causes the spine of the pages being bound together to become roughened. Roughening of the spine increases the surface area to which adhesive material is applied thereby increasing the efficiency of the adhesive bond. Roughening of the spine also permits adhesive material to be deposited between pages which also increases bond efficiency. Scraping edge 204 of trough 202 is situated immediately adjacent to applicator surface 201 and serves to remove adhesive material therefrom after the surface 201 has contacted and deposited adhesive material on the spine of the pages being bound. It has surprisingly been found that removal of adhesive material from the applicator surface after contact further increases bond efficiency since it ensures that a fresh, uniform hot layer of adhesive material is contained on surface 201 immediately prior to the contact of surface 201 with the spine of the pages being bound. The adhesive material removed by scraping edge 204 from surface 201 is discharged from trough 202 by flowing through cut out 203 in the manner depicted by flow arrows 205. The discharged adhesive material is thereafter recirculated through the discharge and intake compartments of reservoir 91 where it is reheated to the proper temperature.

Scraping edge 204 and trough 202 as shown in FIG. 11*d* may be used in conjunction with the components of the adhesive applicator assembly shown in FIGS. 11*a*, 11*b* and 11*c* or they may be used alone with applicator 92. When used in conjunction with the components shown in FIGS. 11*a*, 11*b* and 11*c*, doctor blade 192 controls the thickness of the layer of adhesive material contained on the surface of applicator 92 prior to the application of the adhesive material to the spine of the pages being bound by removing excessive adhesive from applicator surface 201 after surface 201 has been immersed in reservoir 91 containing hot adhesive material and before surface 201 containing the layer of hot adhesive material is applied to the spine. Scraping edge 204 removes residual adhesive material from surface 201 of the applicator 92 after surface 201 has applied adhesive material to the spine of the pages being bound and before immersion of surface 201 into reservoir 91 of hot adhesive material.

Adhesive applicator 92 may have a smooth surface as illustrated in FIG. 10, or it may have a patterned design formed by lands and grooves 201. Designs created by knurling, serrations, intaglio, etc., may be used. A patterned design 6 on the surface of applicator 92 provides a more efficient coating of adhesive on the edge of the pages being bound in that the surface imparts a fanning action to the pages while the adhesive material is being applied, thereby permitting adhesive material to be deposited between pages as well as on the edge of the pages being bound.

Operation

The apparatus of this invention is readied for operation by adding a suitable amount of adhesive material to reservoir 91 by opening lid 81. The material is heated, if necessary, by supplying power to heating elements contained under base 163, the temperature of the mass being controlled by thermostat 162. In order to prevent damage to various parts, the electrical circuitry is designed to prevent operation of motor 130 until the adhesive material reaches the proper temperature. Upon reaching flow temperature, the entire mass is maintained at a substantially uniform temperature by continuous circulation from the pumping compartment through the discharge compartment to the intake compartment and back to the pumping compartment by the pumping action of axle 160. Power is supplied to drive applicator 92 from motor 130 via drive shaft 109, drive roller 111, bead chain 117 and applicator drive roller 93. Doctor blade 192 and scraper blade 190 are adjusted prior to use and maintain proper thickness of adhesive material on applicator 92 and spine of the pages being bound respectively.

When the apparatus is ready for use as indicated by the adhesive material reaching the proper temperature, movable carriage member 20 is situated in its starting position as indicated in FIG. 1. The end of the pages to be bound are placed between stationary clamp face member 32 and movable clamp face member 34. Movable clamp face member is then pushed firmly against the pages by lowering clamp handle 38 and moving it inward. When clamp handle 38 is lowered, cam 181 is rotated thus releasing the tension flat locking spring member 36 exerts against channels 31. After movable clamp face member 34 is positioned, handle 38 is raised thereby locking movable clamp face member 34 in position.

Upon lowering handle 102, drive roller 111 contacts floating drive bar 124 causing the entire movable carriage member 20 including clamping assembly 30 to travel to its final position (shown in FIG. 2) along elongated carriage bar member 50. When motion is first imparted to movable carriage member 20, hop cam follower 24 on leading leg 23 of movable carriage member 20 rides up and over hop cam 63 causing the entire movable carriage to be temporarily elevated. This vertical motion causes the forward edge of the spine of the pages carried in the clamp assembly not to contact adhesive applicator 92. Initial contact of the applicator 92 to the pages is made at a point slightly rearward of the lead edge of the pages thus preventing any undesired accumulation of adhesive material at the very edge or near edge of the book being formed. Since applicator 92 and reservoir 91 are attached to stationary support member 80, they remain stationary while the movable member 20 is being elevated.

As movable carriage member 20 travels along elongated carriage bar member 50, adhesive is applied to the spine of the book being formed. As movable carriage member 20 approaches its final position, platform support automatic release 22 positioned on the rear leg 21 of carriage member 20 disengages drive roller 111 by tripping platform support plate 105. Before disengagement of drive roller 111, movable carriage 20 compresses resilient stop 65 which causes the carriage to retrace a predetermined distance before coming to a complete stop. If a cover is desired, this slight retrace is necessary to bring the adhesive bearing pages carried in clamping assembly 30 into proper registration with cover mounting assembly 70. Thereafter, cover 75 is mounted on the spine of the pages by raising handle 73 momentarily until the cover becomes bound to the pages. When cover mounting assembly 70 is employed, blower vent 45 is covered with lid 47 to prevent premature setting of the adhesive material on the pages and particularly before a cover can be mounted. Optionally, if cover mounting assembly 70 is not used, lid 47 is removed so that a stream of air is directed onto the spine of the pages to accelerate the setting time.

After the cover is mounted, the book is removed by lowering handle 38 and movable carriage member 20 is returned to its starting position either manually or by power. The carriage may be powered to its original position by attaching a return floating drive bar member (not shown) similar to 124 in FIG. 3*a* below drive roller 111. When drive roller 111 contacts the return floating drive bar, it causes reverse movement of the movable carriage member. Proper pressure is maintained between drive roller 111 and return floating drive bar by a mechanism similar to idler support member 123 and idler roller 118. Alternately, movable carriage member 20 can also be returned to its original position by reversing the rotation of drive roller 111.

In an alternative embodiment (not shown), the page clamping assembly can be attached to the stationary support member and the adhesive applicator can be attached to the movable carriage member. In accordance with this embodiment, the pages are adhesively bound together by the applicator moving along the edge of the pages being bound.

Many types of adhesive materials may be employed in conjunction with this invention. Included among the preferred adhesives are various kinds of glue, synthetic resins, including olefin polymers, polymers derived from dienes, vinyl polymers, vinylidene polymers, heterochain thermoplastics, thermosetting resins and mixtures or blends thereof with other polymers or additives. Particularly useful are the hot melt plastic adhesives. Also useful are adhesives contained in evaporatable solvent carriers.

The reservoir used in conjunction with the invention described herein for containing the adhesive material can be of any shape so long as it includes a base and sides and is dividable into a pumping compartment, an intake compartment and a discharge compartment. While blower 150 of FIG. 2*a* is the preferred means for accelerating adhesive setting time, several alternative means are available for this function, including vacuum means when the adhesive material includes a solvent material, cold roller means, secondary heating means such as infrared, etc.

Scraper blades 190 and 204 can be made of any material. When they are made of a material which has a relatively high coefficient of friction with respect to the adhesive material causing the adhesive material to stick thereto, the heat conducted to the blade by extensions 191 heats blade 190 and 204 and also the adhesive material adhering to the surface thereof. The heat reduces the viscosity of the adhesive material thereby lowering the coefficient of friction between the material and the blade. The lower coefficient of friction reduces the tendency of the material to adhere to the blade increasing the efficiency of operation of the blade. Alternatively, scraper blade 190 and 204 can be made of a material having a low coefficient of friction with respect to the adheseive material such as nylon or teflon, thus eliminating the need for heating the blade.

While the preferred source of power for the novel apparatus described herein is an electric motor, any type of power source, either manual or electrical, can be utilized.

The apparatus constituting the invention described herein has several distinct advantages over prior art apparatus. The initial cost of the machine is relatively inexpensive and is operated on a very economic basis. Thus, it is readily adaptable for use in a home, office, factory or other setting. While most binding machines are permanent installations, the apparatus described herein is readily transportable. Since it has few moving parts, it is not subject to frequent repairs.

Even though the apparatus of this invention is relatively compact and transportable, it is capable of binding a large number of pages regardless of size. It is very easy to operate and all operations can in fact be performed by one person. Ease of operation is further facilitated by the ease of installation of pages in the clamping assembly.

A distinct advantage is that it neatly and efficiently binds pages providing a smooth even coating of adhesive material without any undesired accumulation of the material. The bond obtained is very efficient since in operation, a fresh, uniform hot layer of adhesive is continuously being applied to the pages, and adhesive material is applied not only to the edges of the pages, but also is forced slightly between the pages being bound.

Accurate cover mounting is insured in use of the apparatus of this invention because of the means employed to bring the cover into registration with the pages. While many binding machines require two or more applicators, the device of this invention accomplishes the same result utilizing only one applicator. By employing the axle of the applicator as a pump for circulating adhesive material, and by proper placement of baffles, the adhesive material is maintained at a uniform consistency.

The invention has been described in detail with particular reference to certain preferred embodiments thereof, but it will be understood that variations and modifications can be effected within the spirit and scope of the invention.

We claim:

1. In an adhesive reservoir and applicator assembly comprising:

a. a reservoir for adhesive material having an intake compartment, a discharge compartment and a pumping compartment; and b. a cylindrical adhesive applicator in said pumping compartment;

the improvement comprising a trough having a first end panel, a second end panel having a cutout portion, a front panel formed by the surface of said adhesive applicator, a back panel situated between said first end panel and said second end panel, a bottom panel situated between said first end panel and said second end panel, one side of said bottom panel being adjoined to said back panel and the remaining side of said bottom panel having a scraping edge for removing adhesive material from the surface of said applicator after said surface has been coated with adhesive and presented for application to an adhesive receiving article and before said surface is immersed in the reservoir wherein the adhesive material which is removed by said scraping edge flows into said trough, through said cutout portion and into said discharge compartment.

2. The adhesive reservoir and applicator assembly of claim 1 including a doctor blade in close proximity to a peripheral portion of said adhesive applicator and a scraper blade for removing excess adhesive material from the edges of a book.

3. The adhesive reservoir and applicator assembly of claim 2 wherein said reservoir has a bottom, elongated sides and a pair of transverse ends between said elongated sides.

4. The adhesive reservoir and applicator assembly of claim 3 wherein said adhesive applicator is rotatably mounted on an axle supported by said elongated sides.

5. The adhesive reservoir and applicator of claim 4 wherein a screen extends inwardly from an elongated side and situated immediately in front of and upstream from said scraping edge for removing adhesive material from the surface of said applicator.

6. The adhesive reservoir and applicator assembly of claim 5 wherein the surface of said cylindrical applicator comprises a series of lands and grooves.

7. In an apparatus for adhesively binding together pages to form a book comprising:

a. a movable carriage member with means to clamp pages;

b. an elongated carriage bar member;

c. a reservoir for adhesive material having an intake compartment, a discharge compartment and a pumping compartment; and d. a cylindrical adhesive applicator in said pumping compartment;

the improvement comprising a trough having a first end panel, a second end panel having a cutout portion, a front panel formed by the surface of said adhesive applicator, a back panel situated between said first end panel and said second end panel, a bottom panel situated between said first end panel and said second end panel, one side of said bottom panel being adjoined to said back panel and the remaining side of said bottom panel having a scraping edge for removing adhesive material from the surface of said applicator after said surface has been coated with adhesive and presented for application to an adhesive receiving article and before said surface is immersed in the reservoir wherein the adhesive material which is removed by said scraping edge flows into said trough, through said cutout portion and into said discharge compartment.

8. The apparatus of claim 7 including a doctor blade in close proximity to a peripheral portion of said adhesive applicator and a scraper blade for removing excess adhesive material from the edges of the book.

9. The apparatus of claim 8 wherein said reservoir has a bottom, elongated sides and a pair of transverse ends between said elongated sides.

10. The apparatus of claim 9 wherein said adhesive applicator is rotatably mounted on an axle supported by the elongated sides.

11. The apparatus of claim 10 wherein the applicator surface comprises a series of land and grooves.

12. The apparatus of claim 11 wherein the scraping blade is of a material having a low coefficient of friction with respect to the adhesive material.

13. The apparatus of claim 12 wherein the blade are one of teflon or nylon.

14. The apparatus of claim 13 including means for adhesively binding a cover to the book formed.

15. The apparatus of claim 14 wherein said means for adhesively binding a cover to the book comprises, a. a cover assembly frame having a base and sides supported by said base;

b. an elongated cover mounting bar having transverse extensions at either end thereof, the ends of said extentions being pivotally attached to said cover assembly frame sides; and c. means for pivotally moving said transverse extensions thereby causing said cover mounting bar to be raised and lowered whereby a cover positioned on said mounting bar can be raised into contact with the adhesive bearing spine of said book.

* * * * *